Oct. 18, 1955  C. A. HOLLINGSWORTH  2,720,972
TONNAGE TOTALIZER
Filed April 26, 1954  2 Sheets-Sheet 2
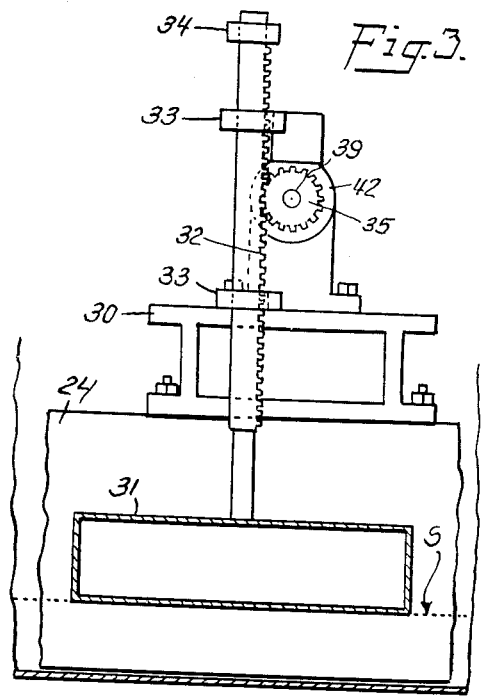
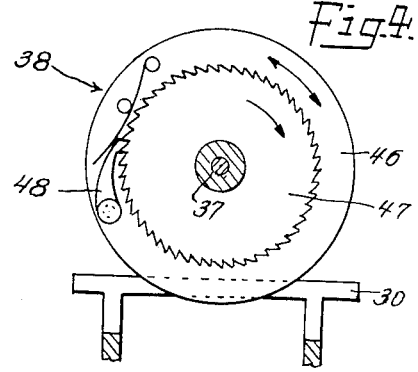
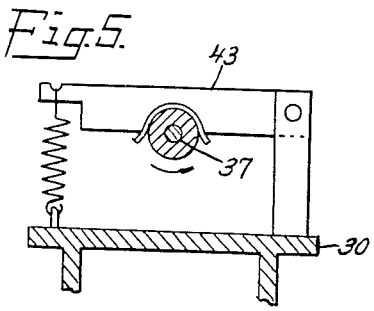
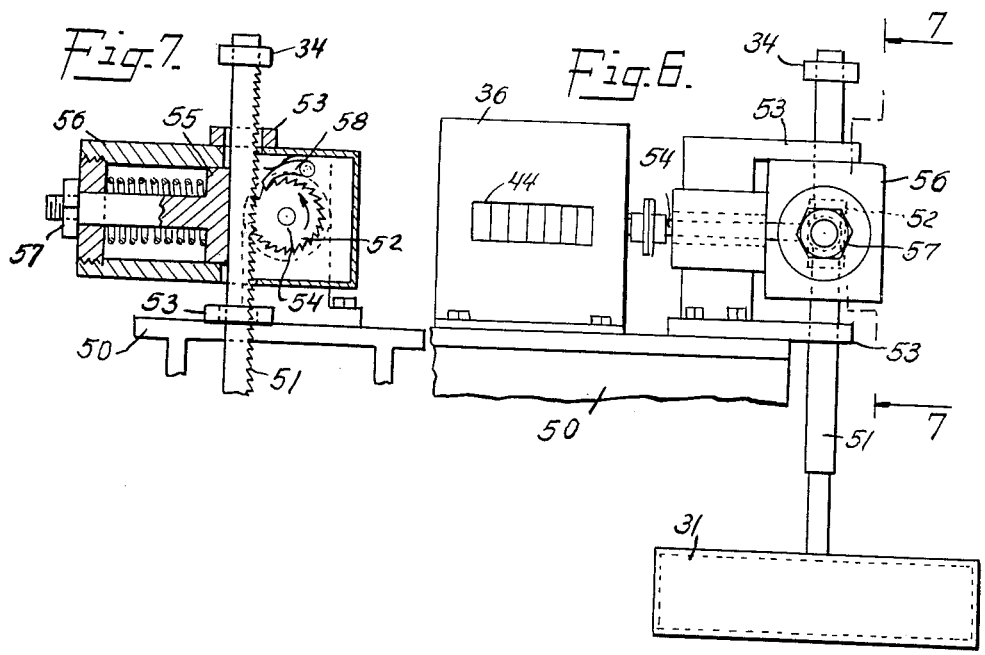
INVENTOR
CLINTON A. HOLLINGSWORTH
BY
Pennie, Edmonds, Morton, Barrows Taylor
ATTORNEYS

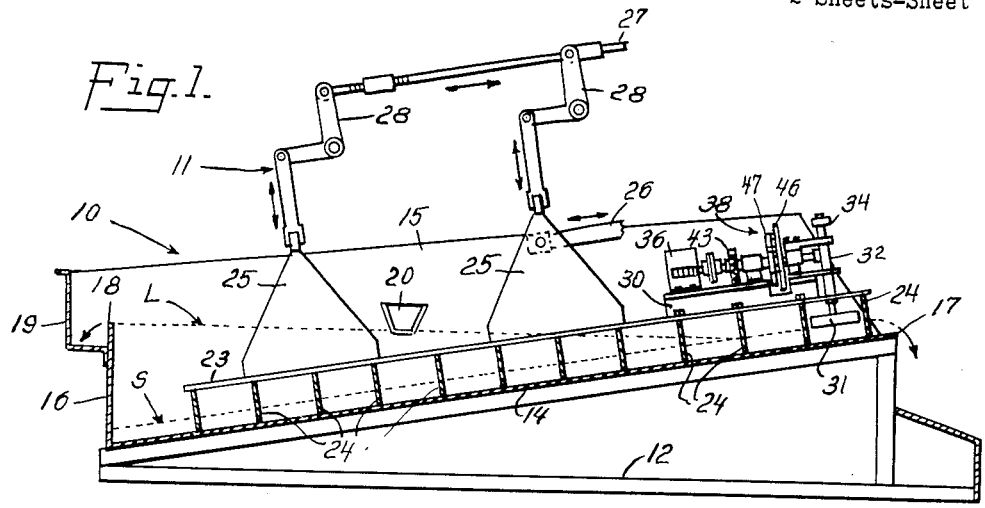

United States Patent Office 2,720,972
Patented Oct. 18, 1955

2,720,972

TONNAGE TOTALIZER

Clinton A. Hollingsworth, Lakeland, Fla., assignor to Smith-Douglass Company, Incorporated, Norfolk, Va., a corporation of Virginia Application April 26, 1954, Serial No. 425,491

5 Claims. (Cl. 209—462)

This invention relates to material measuring devices. More particularly, it relates to devices for approximating the amount of solid material processed by machines such as rake-type classifiers.

In processes or unit operations in which solid material is treated or handled by machines such as rake-type classifiers, it is frequently desirable to determine the amount of solid material being processed by these machines. Although the amount of solid material being processed can be determined by weighing or otherwise measuring the quantity of solids being discharged from the machine, it is usually inconvenient to weigh or measure the solid material at this point. For example, in most such machines the solid material discharged therefrom is conveyed directly to other apparatus for further treatment. Moreover, in certain machines, particularly those of the type exemplified by rake-type classifiers, the solid material does not flow from the machine evenly or in a continuous stream but rather is discharged intermittently or at regular intervals in quantities varying in weight and volume.

Although solid material is discharged from a rake classifier intermittently and in irregular amounts, I have found that the material is discharged in the form of a bed having a width and length (over a predetermined interval of time) that is determined by the operational settings of the classifier mechanism. Therefore, to approximate the amount of solid material handled by the classifier, I have devised a tonnage totalizer device which employs a reciprocatory movement to measure during said interval of time the depth of the bed of solid material disposed therebeneath. As the width and the length (per interval of time) of the bed of solid material are known, the depth of the bed, as determined by my device, is a measure of the amount of solid material being processed by the rake classifier and being discharged therefrom.

The tonnage totalizer of my invention comprises, therefore, the combination with a rake classifier having an inclined bottom and a rake mechanism for moving settled solid material upwardly along the bottom of the classifier, of a device operatively carried by the rake mechanism for approximating the amount of settled solid material moved by the rakes over the bottom. The measuring device comprises an element adapted to move periodically through a distance which is a measure of the depth of solid material then being moved by the rake along the bottom of the classifier at the time of the element's movement. Registering means are provided which are actuated by each of the element's periodic movements so that the distance travelled by the element can be measured and, therefore, the amount of material being discharged from the classifier can be approximated.

Apparatus embodying my invention for approximating the amount of material handled by machines such as rake-type classifiers is shown in the accompanying drawings, in which Fig. 1 is an elevation of a rake-type classifier, with the classifier settling trough and rakes shown in longitudinal section, equipped with an advantageous embodiment of my novel tonnage totalizer, Fig. 2 is an enlarged side view of the tonnage totalizer shown in Fig. 1, Fig. 3 is a sectional view along lines 3—3 of Fig. 2 showing the rack and pinion arrangement by which the float element is operatively connected to the totalizer drive shaft, Fig. 4 is a sectional view along lines 4—4 of Fig. 2 showing the ratchet mechanism of the device shown in Fig. 2, Fig. 5 is a sectional view along line 5—5 of Fig. 2 showing the details of the friction brake, Fig. 6 is a side view of another advantageous embodiment of my tonnage totalizer, and Fig. 7 is a sectional view along lines 7—7 of Fig. 6.

Rake classifiers are essentially dewatering machines in which the coarse or heavy solid particles (commonly called sands) in an aqueous or other liquid pulp are separated from the liquid and the finer or lighter solid particles (commonly called slimes), and are in wide use for desliming mineral and other pulps by overflowing slimes, for the rough sizing of solid particles by overflowing fine solids and raking coarse solids, and for various other purposes. A typical rake classifier is shown in Fig. 1 and comprises generally an inclined settling trough 10 and a rake mechanism 11. The inclined settling trough 10 is supported by a base structure 12 and has an inclined bottom 14, side walls 15 and a lower end wall 16. The inclined bottom 14 terminates at its uppermost end in a sands discharge lip 17. The upper edge of the lower end wall 16 constitutes a liquid overflow weir 18 over which slimes from the settling trough flow into a discharge launder 19. A feed trough 20 is provided through which the pulped feed is introduced into the settling trough 10 of the classifier. The operating liquid level of the classifier is indicated at L and is determined by the height of the overflow weir 18. The coarser or heavier solid particles of the pulp in the trough 10 settle through the liquid medium and build up on the inclined bottom of the settling trough 10 in a bed the height of which is indicated at S. The bed of solid material is moved gradually toward the discharge lip 17 of the classifier by means of the rake mechanism 11.

The rake mechanism 11 of the classifier comprises a longitudinal frame 23, a plurality of transverse rake members 24 depending from the frame 23, hanger members 25 rigidly connected to the frame 23, and a reciprocating mechanism connected to the hangers 25 for moving the frame 23 and rake members 24 is a reciprocatory cyclic path of travel. The reciprocating mechanism imparts a forward and backward movement to the rake members 24 by means of the reciprocating connecting rod 26, and imparts an upward and downward movement thereto by means of the reciprocating connecting rod 27 and bell crank levers 28. The mechanism is adjusted so that at the limit of their downward movement the rake members 24 touch or barely clear the inclined bottom 14 of the settling trough 10, and at the limit of their forward movement the rake member 24 nearest the discharge opening of the classifier closely approaches the discharge lip 17.

In operation, the reciprocating mechanism moves the frame 23 and rake members 24 in a cyclic path of travel having in sequence forward, upward, rearward and downward components. On the forward component of the cyclic path, the solid material which has settled on to the inclined bottom 14 of the settling trough is raked upwardly along the inclined bottom toward the discharge opening of the classifier. At the forward limit of travel of the rakes, the reciprocating mechanism moves the rake members 24 upward clear of the settled solid material and then, in sequence, rearward to the rearward limit of travel of the rakes and downward into raking position.

The quantity of solid material raked by the rake mechanism and discharged through the discharge opening of the classifier is a function of the length of stroke of the rake mechanism, the width of the discharge opening and the depth of the bed of solid material. As the width of the discharge opening and the length of stroke of the rake mechanism are determined by the operational settings of the rake classifier, and as the density and moisture content of the solid material discharged remain substantially constant throughout continuous operation of the classifier, it is apparent that the weight on a dry basis of the solid material being handled by the classifier is a function of the depth of the bed of solid material being discharged from the classifier. By measuring the depth S of the bed of solid material each time the cyclic operation of the rake mechanism moves a portion of the bed upwardly and over the discharge lip 17 of the classifier, and by totalizing these individual measurements of the depth of the bed, it is possible to approximate the total weight or tonnage of solid material that is handled by the classifier over a period of time.

My device for approximating the amount of material handled by the rake classifier comprises means for measuring the depth of the bed of solid material adjacent the discharge opening of the classifier as the material is discharged therefrom, and means for totalizing these individual bed-depth measurements over a period of time. As shown in Figs. 1 and 2, the tonnage totalizer is mounted on a base 30 secured to the longitudinal frame 23 and rake members 24 of the rake mechanism 11 so that it moves with the rake mechanism through its reciprocatory cyclic path of travel. The means for measuring the depth of the bed of solids comprises a float element 31 secured to a vertical rack 32 that is mounted in guides 33 so that the float element is vertically movable with respect to the rake mechanism 11. The rack 32 is provided with a stop element such as the collar 34 adjacent its upper end which limits the downward travel of the rack with respect to the rake mechanism 11. The collar 34 is positioned so that when the rake mechanism is at the limit of its downward movement, and when there is no solid material in the settling trough 10, the float element 31 touches or just barely clears the inclined bottom 14 of the classifier, as indicated by the dotted line in Fig. 2. The float element 31 is adapted, when in contact therewith, to rest upon the bed of solid material without penetrating or sinking thereinto, as indicated by the solid lines depicting the float element in Figs. 2 and 3. As shown in Fig. 3, the float element 31 is connected through the rack 32 and a pinion gear 35 to the means for totalizing the individual measurements of the depth of the bed of solids.

The means for totalizing the bed-depth measurements comprises a totalizer 36 connected by means of a drive shaft 37 to a ratchet mechanism 38 which, in turn, is connected by means of a shaft 39 to the pinion gear 35. The shafts 37 and 39 are supported by bearings 41 and 42, respectively. A friction brake 43 is disposed on the shaft 37 adjacent the bearing 41 to prevent rotation of the shaft except when the shaft is positively driven by the ratchet mechanism 38. The arrangement of totalizer 36, brake 43 and ratchet mechanism 38 is such that rotation of the pinion gear 35 in one direction will actuate the totalizer and cause it to register the amount of this rotation while rotation of the pinion gear in the opposite direction will have no effect on the totalizer 36 at all.

The totalizer 36 is a mechanical counting device, such as a revolution counter, that adds up and indicates at a register window 44 the amount of rotation of the drive shaft 37 of the device. Commonly, such devices simply register the total number of revolutions of the drive shaft, in which case the increment in the number appearing in the window 44 is converted into tonnage of solid material handled by the classifier by the use of a suitable calibration curve. Advantageously, however, the totalizer 36 is pre-calibrated so that the increment in the number appearing in the window 44 over a period of time indicates directly the tonnage of material handled by the rake classifier with which totalizer is used during that period of time.

The ratchet mechanism 38, as shown in Fig. 4, comprises a drive plate 46 mounted on the shaft 39 and a ratchet gear 47 mounted on the shaft 37. A spring loaded pawl 48 is mounted on the drive plate 46 so that it overlies the ratchet gear 47 in position to engage the teeth thereof. Rotation of the shaft 39 in a counter-clockwise direction (when viewed from the end of the device, as in Fig. 3) causes the pawl 48 to engage the teeth of the ratchet gear 47 and to rotate the ratchet gear and the shaft 37 a corresponding amount. Rotation of the shaft 39 in a clockwise direction causes the pawl 48 to slide over the teeth of the ratchet gear 47, thus avoiding rotation of the ratchet gear and the shaft 37 that would subtract from, rather than add to, the total indicated at the window 44 of the totalizer 36. The brake 43, shown best in Fig. 5, serves to prevent unwanted rotation of the shaft 37 due to vibration of the rake mechanism or to friction between the pawl and the ratchet gear.

The tonnage totalizer of my invention utilizes the reciprocatory cyclic movement of the rake mechanism 11 and the resulting relative movement between the rake mechanism 11 and the float element 31 to determine the depth of the bed of solids resting on the inclined bottom 14 of the rake classifier. Assuming a level S of solid material on the inclined bottom of the classifier, the movement of the rake mechanism brings the rakes 24 and the float element 31 into contact therewith on the downward component of the cyclic path of travel of the rake mechanism. When the float element 31 contacts the surface of the bed of solids, its downward movement stops while the rake mechanism 11 continues to move downward to the lower limit of its travel with the rakes 24 adjacent the inclined bottom 14 of the classifier. During the forward component of the cyclic movement of the rake mechanism 11, the float element 31 rests on the surface of the bed of solids being moved by the rakes 24 toward the discharge opening of the classifier and, therefore, remains stationary with respect to the rake mechanism. During the upward component of the cyclic movement, however, the rake mechanism 11 again moves relative to the float element 31 until the rake mechanism contacts the collar 34, thereby raising the float element clear of the bed of solids. During the rearward component of the cyclic movement, the float element 31 is supported by the collar 34 and, therefore, remains stationary with respect to the rake mechanism.

The relative movement of the float element 31 with respect to the rake mechanism 11 is a direct measure of the depth S of the bed of solids discharged from the classifier during each full cycle of movement of the rake mechanism. This relative movement is recorded by means of the totalizer 36. When the float element 31 comes to rest on the surface of the bed of solids and until the rake mechanism reaches the limit of its downward travel, the rack 32, in effect, moves upwardly with respect to the pinion 35, causing the pinion 35 and the shaft 39 to rotate in a clockwise direction. As noted hereinabove, clockwise rotation of the shaft 39 has no effect on the totalizer 36 because of the ratchet mechanism 38 and the brake 43. However when the rake mechanism commences to move upward at the limit of its forward travel and until the rake mechanism contacts the collar 34 and raises the float element clear of the bed of solids, the rack 32, in effect, moves downwardly with respect to the pinion 35, causing the pinion 35 and the shaft 39 to rotate in a counterclockwise direction. Counter-clockwise rotation of the shaft 39, as hereinbefore noted, causes the drive shaft 37 to rotate and the totalizer 36 to register a corresponding increment in the number appearing in the window 44.

Because the drive shaft 37 of the totalizer 36 can rotate only in one direction, the increment in the number appearing in the window 44 of totalizer 36 during each full cycle of movement of the rake mechanism is a direct measure of the depth of the bed of solids being discharged from the discharge opening of the rake classifier. In order to determine the total depth of the solid material discharged from the classifier, it is merely necessary to determine the total increment in the number appearing in the window 44 and to convert this increment into tonnage of dry material handled by the classifier through the use of a suitable calibration chart. In a pre-calibrated totalizer, the increment in the number appearing in the window 44 may read directly in tonnage of solids handled by the rake classifier or other machine with which the tonnage totalizer is used.

The embodiment of my invention shown in Figs. 6 and 7 comprises essentially the same structural components as the embodiment thereof shown in Figs. 1 through 5. The tonnage totalizer is mounted on a base 50 and comprises a float element 31 and a totalizer 36 which are operatively connected together by means of a rack 51 and pinion 52. The rack 51 is mounted in guides 53 that permit vertical movement of the rack, and also slight lateral movement thereof, with respect to the pinion, and the pinion 52 is mounted on the shaft 54 that is connected to the totalizer 36.

As seen in Fig. 7, the ratchet mechanism is incorporated in the structure of the rack and pinion of the tonnage totalizer. Both the rack 51 and the pinion 52 have ratchet teeth which are adapted to engage each other when the rack moves downwardly with respect to the pinion and to slide over each other when the rack moves upwardly with respect to the pinion. The rack 51 is urged against the pinion 52 by means of a spring-loaded pressure plate 55 contained within a casing 56. The force with which the pressure plate 55 urges the rack 51 against the pinion 52 is adjusted by means of the nut 57 so that when the rack moves downwardly with respect to the pinion the ratchet teeth of the rack and the pinion firmly engage each other, and when the rack moves upwardly with respect to the pinion the teeth of the rack side over those of the pinion. A spring-loaded pawl 58 prevents rotation of the pinion 52 when the rack slides upwardly by the ratchet teeth of the pinion. Thus, as the rack 51 moves upward and downward with respect to the pinion 52 and the rake mechanism 11, the pinion rotates in one direction only (that is, counterclockwise, when viewed from the forward end as in Fig. 7) and the totalizer 36 registers the amount of this rotation as an increment in the number appearing in the window 44.

The operation of the tonnage totalizer shown in Figs. 6 and 7 is the same as that shown in Figs. 1 through 5. That is, the reciprocatory movement of the rake mechanism brings the float element 31 and rake members of the mechanism into contact with the bed of solids on the downward component of its cyclic path of travel. The downward movement of the float element is stopped by the bed of solids while the rake mechanism continues downward to the lower limit of its cyclic path of travel, thus causing the rack 51 to slide upwardly by the pinion 52. At the end of the forward component of its movement, the rake mechanism moves upward causing the rack 51 to move downwardly with respect to the pinion 52 until the rake mechanism contacts the collar 34 and raises the float element 31 clear of the bed of solids. The downward movement of the rack 51 with respect to the pinion 52 causes the rack to engage the ratchet teeth of the pinion and rotate the pinion in a counter-clockwise direction. The counter-clockwise rotation of the pinion 52 causes a corresponding increment in the number appearing in the window 44 to be registered by the totalizer 36. As noted hereinabove, the increment in the number appearing in the window 44 of the totalizer is a direct measure of the total depth of the bed of solid material discharged from the rake classifier, and hence is a measure of the total amount of solids handled by the classifier.

Although my novel tonnage totalizer device is described in connection with a rake-type classifier, its use is not limited thereto. My device can readily be adapted to approximate the amount of solid material handled by other machines from which a bed of the material is continuously or intermittently discharged in a fashion that permits measurement of the depth of the bed by means of my invention. When used with such other machines, the reciprocatory movement employed by my device to effect the measurement of the depth of the bed of solids can be imparted to my device by any suitable reciprocating mechanism. Moreover, it is apparent that the depth of the bed of solid material can be measured by appropriate adjustment of my device on either the upward or downward component of its reciprocatory path of travel. My device, therefore, is a versatile and useful means for approximating the amount of a moving bed of solid material passing therebeneath that cannot otherwise be conveniently measured.

I claim:

1. The combination with a rake classifier having an inclined bottom and a rake mechanism for moving settled solid material upwardly along said bottom, of a device operatively carried by said mechanism for approximating the amount of settled solid material moved by the rakes over said bottom and comprising an element adapted to move periodically through a distance which is a measure of the depth of solid material then being moved by the rakes along said bottom at the time of the element's movement, and registering means actuated by each of the element's periodic movements.

2. The combination with a classifier having an inclined bottom up which solid material settling thereon is adapted to be moved by rakes operatively connected to a mechanism for driving the rakes in a reciprocatory cyclic path, of a device operatively carried by said mechanism for approximating the amount of settled solid material that said rakes move upwardly along said inclined bottom and comprising an element vertically movable relative to said mechanism, said element moving with said device in a cyclic path corresponding to that of the rakes and in said cyclic path being adapted to rest upon the settled solid material when said material is moved, registering means, and means operatively connected to said element for actuating said registering means an extent determined by the depth of settled solid material directly beneath the element each time the element in its aforesaid cyclic path rests upon the settled solid material on said bottom.

3. The combination with a classifier having an inclined bottom up which solid material settling thereon is adapted to be moved by rakes operatively connected to a mechanism for driving the rakes in a reciprocatory cyclic path, of a device operatively carried by said mechanism for approximating the amount of settled solid material that said rakes move upwardly along said inclined bottom and comprising a vertically movable element adapted periodically to rest upon the settled solid material on said bottom while moving in a cyclic path corresponding to that of the rakes, registering means, and means operatively connected to said element for actuating said registering means an extent determined by the depth of settled solid material directly beneath the element each time the element in its aforesaid cyclic path rests upon the settled solid material on said bottom.

4. The combination with a classifier having an inclined bottom up which solid material settling thereon is adapted to be moved by rakes operatively connected to a mechanism for driving the rakes in a reciprocatory cyclic path having in sequence forward, upward, rearward and downward components, of a device operatively carried by said mechanism for approximating the amount of settled solid material that said rakes move upwardly along said inclined bottom and comprising an elemetnt adapted periodically to rest upon the settled solid material on said bottom while moving in a cyclic path corresponding to that of said rakes, registering means, and means operatively associated with said element for actuating said registering means an extent corresponding to the depth of settled solid material directly beneath the element at the time the element in its aforesaid cyclic path rests upon the settled solid material in said bottom.

5. The combination with a classifier having an inclined bottom up which solid material settling thereon is adapted to be moved by rakes operatively connected to a mechanism for driving the rakes in a reciprocatory cyclic path having in sequence forward, upward, rearward and downward components, of a device operatively carried by said mechanism for approximating the amount of settled solid material that said rakes move upwardly along said inclined bottom and comprising an element vertically movable with respect to said mechanism and adapted periodically to rest upon the settled solid material on said bottom while moving in a cyclic path corresponding to that of said rakes, registering means, and means operatively associated with said element for actuating said registering means an extent corresponding to the depth of settled solid material directly beneath the element at the time the element in its aforesaid cyclic path rests upon the settled solid material in said bottom.

References Cited in the file of this patent

UNITED STATES PATENTS 1,773,816     Lea ------------------ Aug. 26, 1930